(12) United States Patent
Zhou

(10) Patent No.: US 12,462,907 B2
(45) Date of Patent: Nov. 4, 2025

(54) SYSTEMS AND METHODS FOR MANAGING MEDICAL INFORMATION

(71) Applicant: WUHAN UNITED IMAGING HEALTHCARE CO., LTD., Hubei (CN)

(72) Inventor: Yuyu Zhou, Wuhan (CN)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 208 days.

(21) Appl. No.: 17/804,304

(22) Filed: May 26, 2022

(65) Prior Publication Data

US 2022/0293231 A1    Sep. 15, 2022

Related U.S. Application Data

(63) Continuation of application No. PCT/CN2020/140313, filed on Dec. 28, 2020.

(30) Foreign Application Priority Data

Nov. 13, 2020 (CN) .......................... 202011267040.4

(51) Int. Cl.
*G16H 10/60* (2018.01)
*G06F 16/21* (2019.01)
(Continued)

(52) U.S. Cl.
CPC ............. *G16H 10/60* (2018.01); *G06F 16/21* (2019.01); *G06F 16/27* (2019.01); *G06F 21/62* (2013.01); *H04L 63/08* (2013.01); *H04L 67/12* (2013.01)

(58) Field of Classification Search
CPC ................................ G16H 10/60; G06F 16/21
(Continued)

(56) References Cited

U.S. PATENT DOCUMENTS

| 2004/0215490 | A1* | 10/2004 | Duchon | ................. G16H 80/00 |
| | | | | 705/2 |
| 2012/0117088 | A1* | 5/2012 | Kawakami | ............. G16H 50/70 |
| | | | | 707/752 |

(Continued)

FOREIGN PATENT DOCUMENTS

| CN | 101057244 A | 10/2007 |
| CN | 101808125 A | 8/2010 |

(Continued)

OTHER PUBLICATIONS

International Search Report in PCT/CN2020/140313 mailed on Aug. 12, 2021, 4 pages.

(Continued)

*Primary Examiner* — Muluemebet Gurmu
(74) *Attorney, Agent, or Firm* — METIS IP LLC

(57) ABSTRACT

The present disclosure provides systems and methods for managing medical information. A method may include obtaining, from a terminal device, an access request regarding target information; determining whether the terminal device is authenticated; in response to determining that the terminal device is authenticated, identifying, from a plurality of databases, a target database based on the access request, wherein the plurality of databases are physically separated from each other; obtaining the target information by accessing the target database; and transmitting the target information to the terminal device.

20 Claims, 10 Drawing Sheets

(51) Int. Cl.
*G06F 16/27* (2019.01)
*G06F 21/62* (2013.01)
*H04L 9/40* (2022.01)
*H04L 67/12* (2022.01)

(58) Field of Classification Search
USPC .......................................................... 707/781
See application file for complete search history.

(56) References Cited

U.S. PATENT DOCUMENTS

| | | | |
|---|---|---|---|
| 2013/0191647 A1* | 7/2013 | Ferrara, Jr. | G16H 10/60 713/186 |
| 2015/0046192 A1* | 2/2015 | Raduchel | H04W 8/18 705/3 |
| 2016/0042124 A1 | 2/2016 | Douglass et al. | |
| 2017/0132378 A1 | 5/2017 | Ukis | |
| 2017/0161439 A1 | 6/2017 | Raduchel et al. | |
| 2018/0359244 A1* | 12/2018 | Cockerill | H04L 63/12 |
| 2020/0252214 A1* | 8/2020 | Cheng | H04L 9/3213 |
| 2020/0334416 A1* | 10/2020 | Vianu | G06V 10/764 |
| 2021/0090694 A1* | 3/2021 | Colley | G16H 15/00 |
| 2021/0335464 A1* | 10/2021 | Poblenz | G06T 7/44 |

FOREIGN PATENT DOCUMENTS

| | | |
|---|---|---|
| CN | 104717223 A | 6/2015 |
| CN | 104834537 A | 8/2015 |
| CN | 108076500 A | 5/2018 |
| CN | 108154907 A | 6/2018 |
| CN | 108565016 A | 9/2018 |
| CN | 108933757 A | 12/2018 |
| CN | 108958927 A | 12/2018 |
| CN | 109949886 A | 6/2019 |
| CN | 109979606 A | 7/2019 |
| CN | 110865636 A | 3/2020 |
| CN | 211237737 U | 8/2020 |
| CN | 111737229 A | 10/2020 |
| CN | 111863222 A | 10/2020 |
| EP | 3644206 A1 | 4/2020 |
| WO | 2013109517 A1 | 7/2013 |

OTHER PUBLICATIONS

Written Opinion in PCT/CN2020/140313 mailed on Aug. 12, 2021, 4 pages.
Benbin Chen et al., Design of Docker-Based Cloud Platform for Smart Medicine Box, 2019 4th International Conference on Intelligent Green Building and Smart Grid (IGBSG), 199-202, 2019.
The Extended European Search Report in European Application No. 20951277.1 mailed on Mar. 5, 2024, 8 pages.
Wu, Sheng et al., Apache SkyWalking in Action, China Machine Press, 2020, 12 pages.
Zhang, Baojun, Research on the Principle and Technology of Network Intrusion Detection, 1st Edition, China Radio, Film and Television Publishing House, 2014, 12 pages.

* cited by examiner

SYSTEMS AND METHODS FOR MANAGING MEDICAL INFORMATION

CROSS-REFERENCE TO RELATED APPLICATIONS

This application is a Continuation of International Application No. PCT/CN2020/140313, filed on Dec. 28, 2020, which claims priority to Chinese Patent Application No. 202011267040.4, filed on Nov. 13, 2020, the contents of which are hereby incorporated by reference.

TECHNICAL FIELD

The disclosure generally relates to intelligent medical systems and methods, and more particularly relates to systems and methods for managing medical information.

BACKGROUND

The advancement of medical technologies, in terms of both availability and complexity, increases the amount of medical data (e.g., patient information, medical imaging data of patients, etc.) that needs to be handled and stored. Existing techniques for managing medical data often involves storing medical data in a medical device by which the medical data is generated. For example, ultrasound imaging data obtained from an ultrasound device may be stored in the ultrasound device. However, medical devices often have a limited storage capacity. The medical data may need to be deleted or exported to a storage device to ensure that the medical device has enough storage capacity to store new medical data. It is difficult to manage massive medical data effectively and securely this way. Further, since the medical data are stored in medical devices, updating the medical data and/or application(s) regarding the medical data in a medical device is usually achieved by updating the whole medical device, which costs a great quantity of manpower and material resource. Thus, it is desired to provide systems and methods for managing medical information effectively and securely.

SUMMARY

According to a first aspect of the present disclosure, a system for managing medical information is provided. The system may include at least one storage device storing executable instructions, and at least one processor in communication with the at least one storage device. When executing the executable instructions, the at least one processor may cause the system to perform one or more of the following operations. The operations may include: obtaining, from a terminal device, an access request regarding target information; determining whether the terminal device is authenticated; in response to determining that the terminal device is authenticated, identifying, from a plurality of databases, a target database based on the access request, wherein the plurality of databases are physically separated from each other; obtaining the target information by accessing the target database; and transmitting the target information to the terminal device.

In some embodiments, the identifying the target database based on the access request may include: determining an identifier of the access request; and identifying the target database based on the identifier.

In some embodiments, the determining whether the terminal device is authenticated may include determining whether the terminal device is authenticated based on an IP address of a network via which the terminal device transmits the access request.

In some embodiments, the determining whether the terminal device is authenticated may include determining whether the terminal device is authenticated based on authentication information the terminal device provides relating to the access request.

In some embodiments, a database of the plurality of databases may be obtained by: obtaining a category of medical information relating to a plurality of patient s; and obtaining the database of the plurality of databases by storing the medical information of the category.

In some embodiments, a database of the plurality of databases may include an application program relating the medical information.

In some embodiments, the application program relating the medical information may include an image processing application program or an automatic measurement application program.

In some embodiments, the operations may further include: obtaining an application installation or update request from the terminal device; identifying, from the plurality of databases, a second target database based on the terminal device and the application installation or update request; obtaining an installation or update package related to the application installation or update request from the second target database; and transmitting the installation or update package to the terminal device.

In some embodiments, the terminal device may access the target information via a browser or an application. the plurality of databases may include a plurality of Docker containers, and the obtaining the target information includes obtaining the target information via a Docker image.

In some embodiments, the system is cloud-based.

In some embodiments, the terminal device may communicate with the system via a local area network.

In some embodiments, the terminal device may access the target database via an application programming interface (API) gateway.

In some embodiments, the operations may further include: in response to determining that the terminal is not authenticated, denying the access request.

In some embodiments, the operations may further include: in response to determining that the terminal is not authenticated, generating a notification indicating that the access request is denied.

In some embodiments, the terminal device may include at least one of an ultrasound device, a computed tomography (CT) device, a magnetic resonance (MR) device, a positron emission tomography (PET) device, an X-ray photography device, an emission computed tomography (ECT) device, a single-photon emission computed tomography (SPECT) device, or a radiotherapy (RT) device.

In some embodiments, the system may be configured to communicate with a plurality of terminal devices and manages medical information of the plurality of terminal devices.

According to a second aspect of the present disclosure, a method for managing medical information is provided. The method may include: obtaining, from a terminal device, an access request regarding target information; determining whether the terminal device is authenticated; in response to determining that the terminal device is authenticated, identifying, from a plurality of databases, a target database based on the access request, wherein the plurality of databases are physically separated from each other; obtaining the target information by accessing the target database; and transmitting the target information to the terminal device.

According to a third aspect of the present disclosure, a non-transitory readable medium is provided. The non-transitory readable medium may include at least one set of instructions for managing medical information. When executed by at least one processor of an electrical device, the at least one set of instructions may direct the at least one processor to perform a method. The method may include: obtaining, from a terminal device, an access request regarding target information; determining whether the terminal device is authenticated; in response to determining that the terminal device is authenticated, identifying, from a plurality of databases, a target database based on the access request, wherein the plurality of databases are physically separated from each other; obtaining the target information by accessing the target database; and transmitting the target information to the terminal device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not scaled. These embodiments are non-limiting exemplary embodiments, in which like reference numerals represent similar structures throughout the several views of the drawings, and wherein.

DETAILED DESCRIPTION

Figure 1:
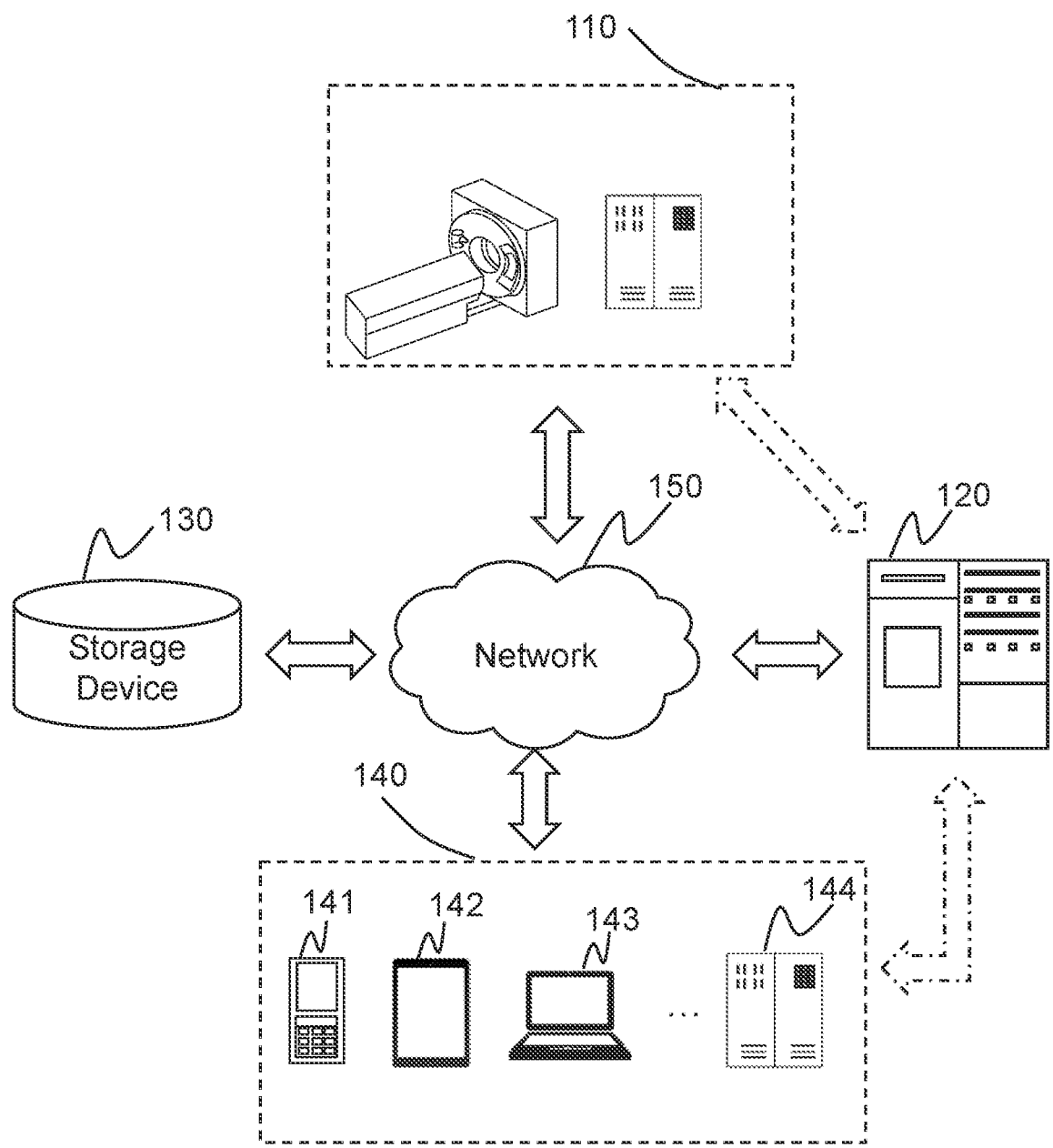
FIG. 1 is a schematic diagram illustrating an exemplary system for managing medical information according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included in programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description regarding the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for managing medical information. The systems and methods may allow authenticated terminal devices (e.g., medical devices, mobile devices, etc.) to communicate with a server. A plurality of databases, which are physically separated from each other, may be deployed on the server. Medical information (e.g., patient information, medical imaging data, etc.) and/or application programs (e.g., an image processing application program, an automatic measurement application program, etc.) may be classified and stored in the plurality of databases. For example, each category of medical information (or each application program and data thereof) may be stored in a database. In response to a request from an authenticated terminal device, the access to information may be limited to information stored in a database commensurate to the access privilege the terminal device has and confirmed by a successful authentication. The authenticated terminal device may access the corresponding database via a browser or an application to improve the security of the medical information. A physically separated environment of the plurality of databases may provide secure and effective management of massive medical information. For example, compared with storing the medical information into local medical devices (or storage devices communicated with the medical devices), the medical devices may be operated more stably, the massive medical information may be managed more securely and effectively. As another example, physically separated databases may simplify the maintenance, deployment, and/or update of application programs by developers or third party suppliers. As still another example, compared with updating the whole medical device, specifically in some emergencies (e.g., a large number of application programs and/or medical information to be deployed and/or updated), manpower and material resource are reduced by only deploying or updating medical information and/or application program(s) at the server. Thus, systems and methods for managing medical information effectively and securely are provided.

FIG. 1 is a schematic diagram illustrating an exemplary system 100 for managing medical information according to some embodiments of the present disclosure. In some embodiments, the system 100 may be an online service platform (a cloud-based platform) for managing medical information. For example, the system 100 may be a platform for managing medical information of a hospital or a plurality of hospitals. As another example, the system 100 may be a platform for managing medical information of a certain type of medical devices (e.g., ultrasound devices, computed tomography (CT) devices, magnetic resonance (MR) devices, positron emission tomography (PET) devices, X-ray photography devices, emission computed tomography (ECT) devices, single-photon emission computed tomography (SPECT) devices, radiotherapy (RT) devices, etc.). As another example, the system 100 may be a microservices platform for managing medical information.

The system 100 may include one or more medical devices 110, a processing device 120, a storage device 130, one or more terminal devices 140, and a network 150. The components in the system 100 may be connected in one or more various ways. Merely by way of example, the medical device(s) 110 may be connected to the processing device 120 through the network 150. As another example, the medical device(s) 110 may be connected to the processing device 120 directly as illustrated in FIG. 1. As a further example, the terminal device(s) 140 may be connected to another component of the system 100 (e.g., the processing device 120) via the network 150. As still a further example, the terminal device(s) 140 may be connected to the processing device 120 directly as illustrated by the dotted arrow in FIG. 1. As still a further example, the storage device 130 may be connected to another component of the system 100 (e.g., the processing device 120) directly as illustrated in FIG. 1, or through the network 150. In some embodiments, the components (e.g., the medical devices 110, the processing device 120, the storage device 130, the terminal devices 140) of the system 100 may be deployed with a certain interface (e.g., a software interface, a hardware interface) to communicate with each other.

The medical device(s) 110 may be configured to acquire medical information (e.g., patient information, image data of a patient, etc.). The patient information may include a name, the age, the gender, an occupation, a phone number, a medical history, etc., of a patient, or any combination thereof. The image data may include an image (e.g., an image slice), projection data, or the like, or a combination thereof. In some embodiments, the image data may be two-dimensional (2D) image data, three-dimensional (3D) image data, four-dimensional (4D) image data (e.g., a series of 3D image data over time), or the like, or any combination thereof. In some embodiments, the medical device(s) 110 may include an ultrasound imaging device, a computed tomography (CT) device, a magnetic resonance (MR) device, a positron emission tomography (PET) device, an X-ray photography device, an emission computed tomography (ECT) device, a single-photon emission computed tomography (SPECT) device, a fluoroscopy imaging device, a radiotherapy (RT) device, or the like, or any combination thereof.

Figure 2:
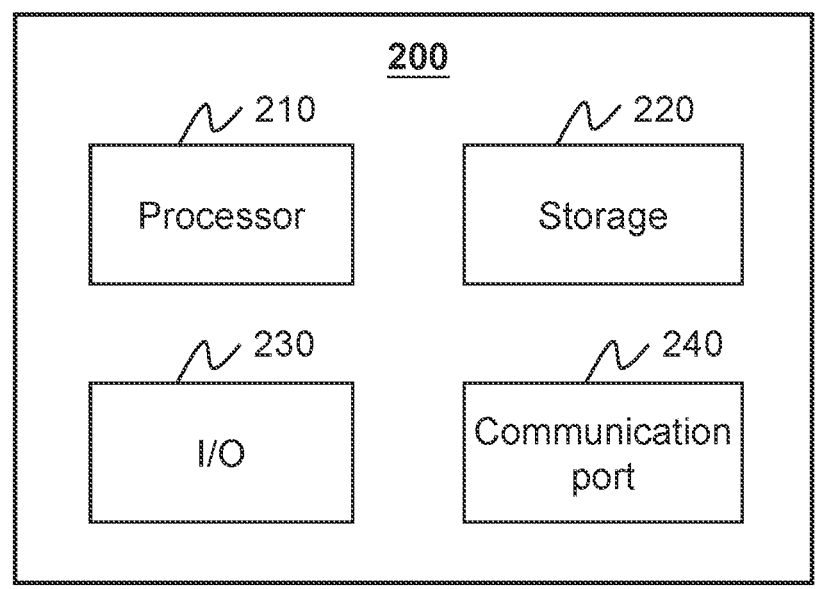
FIG. 2 is a schematic diagram illustrating hardware and/or software components of an exemplary computing device according to some embodiments of the present disclosure.

The processing device 120 may process data and/or information obtained from the medical device(s) 110, the terminal device(s) 140, and/or the storage device 130. For example, the processing device 120 may obtain medical information from the medical device(s) 110 (and/or the terminal device(s) 140) and store different categories of medical information into different databases. As another example, the processing device 120 may obtain application programs from the terminal device(s) 140 and store each application program into a database. As still another example, the processing device 120 may access a target database to obtain target information in response to an access request from an authenticated terminal device 140. In some embodiments, the processing device 120 may be a computer, a user console, a single server or a server group, etc. The server group may be centralized or distributed. In some embodiments, the processing device 120 may be local or remote. For example, the processing device 120 may access information and/or data stored in the medical device(s) 110, the terminal device(s) 140, and/or the storage device 130 via the network 150. As another example, the processing device 120 may be directly connected to the medical device(s) 110, the terminal device(s) 140, and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented by a computing device 200 having one or more components as illustrated in FIG. 2.

The storage device 130 may store data, instructions, and/or any other information. In some embodiments, the storage device 130 may store data obtained from the medical device(s) 110, the terminal device(s) 140, and/or the processing device 120. For example, the storage device 130 may store medical information acquired by the medical device(s) 110. As another example, the storage device 130 may include a plurality of databases that are physically separated from each other. Each database may store a category of medical information or data relating to an application program. In some embodiments, the storage device 130 may store data and/or instructions that the processing device 120 may execute or use to perform exemplary methods/systems described in the present disclosure. In some embodiments, the storage device 130 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the system 100 (e.g., the processing device 120, the terminal device(s) 140, etc.). One or more components in the system 100 may access the data or instructions stored in the storage device 130 via the network 150. In some embodiments, the storage device 130 may be directly connected to or communicate with one or more other components in the system 100 (e.g., the processing device 120, the terminal device(s) 140, etc.). In some embodiments, the storage device 130 may be part of the processing device 120.

The terminal device(s) 140 may enable user interaction between a user (e.g., a medical worker, a patient) and the system 100. In some embodiments, the terminal device(s) 140 may be connected to and/or communicate with the medical device(s) 110, the processing device 120, the terminal device(s) 140, and/or the storage device 130. For example, the terminal device(s) 140 may display medical information (e.g., patient information, a medical image of a patient, etc.) obtained from the processing device 120, the medical device(s) 110, or the storage device 130. The terminal device(s) 140 may include a mobile device 141, a tablet computer 142, a laptop computer 143, a medical device 144, or the like, or any combination thereof. In some embodiments, the medical device 144 and the medical device 110 may be a same device. For example, the processing device 112 may obtain medical information from a medical device for storing and the medical device may also send an access request for accessing the stored medical information. In some embodiments, the mobile device 141 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the medical device 144 may include an ultrasound device, a CT device, an MR device, a PET device, an X-ray photography device, an ECT device, a SPECT device, an RT device, or the like, or any combination thereof.

The network 150 may include any suitable network that can facilitate the exchange of information and/or data for the system 100. In some embodiments, one or more components of the medical device(s) 110, the terminal device(s) 140, the processing device 120, the storage device 130, etc., may communicate information and/or data with one or more other components of the system 100 via the network 150. For example, the processing device 120 may obtain medical information from the medical device(s) 110 via the network 150. As another example, the processing device 120 may obtain an access request regarding target information from and/or transmit the target information to the terminal device (s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, a mobile network (e.g., 3G, 4G, 5G, etc.), or the like, or any combination thereof. In some embodiments, the network 150 may include one or more network access points. For example, the network 150 may include wired and/or wireless network access points such as base stations and/or internet exchange points through which one or more components of the system 100 may be connected to the network 150 to exchange data and/or information.

It should be noted that the above description of the system 100 is merely provided for illustration, and not intended to limit the scope of the present disclosure. For persons having ordinary skills in the art, multiple variations and modifications may be made under the teachings of the present disclosure. For example, the assembly and/or function of the system 100 may be varied or changed according to specific implementation scenarios.

FIG. 2 is a schematic diagram illustrating hardware and/or software components of an exemplary computing device 200 according to some embodiments of the present disclosure. The computing device 200 may be used to implement any component of the system 100 as described herein. For example, the processing device 120 and/or the terminal device(s) 140 may be implemented on the computing device 200, respectively, via its hardware, software program, firmware, or a combination thereof. Although only one such computing device is shown, for convenience, the computer functions relating to the system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (program codes) and perform functions of the processing device 120 in accordance with techniques described herein. The computer instructions may include, for example, routines, programs, objects, components, signals, data structures, procedures, modules, and functions, which perform particular functions described herein. In some embodiments, the processor 210 may process data obtained from the medical device(s) 110, the terminal device(s) 140, the storage device 130, and/or any other component of the system 100. For example, the processor 210 may obtain medical information from the medical device(s) 110 (and/or the terminal device(s) 140) and store different categories of medical information into different databases. As another example, the processor 210 may obtain application programs from the terminal device(s) 140 and store each application program into a database. As still another example, the processor 210 may access a target database to obtain target information in response to an access request from an authenticated terminal device 140. In some embodiments, the target information may be stored in the storage device 130, the storage 220, etc. In some embodiments, the target information may be displayed on a display screen device by the I/O 230. In some embodiments, the processor 210 may perform instructions obtained from the terminal device(s) 140. In some embodiments, the processor 210 may include one or more hardware processors, such as a microcontroller, a microprocessor, a reduced instruction set computer (RISC), an application-specific integrated circuit (ASIC), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the medical device(s) 110, the terminal device(s) 140, the storage device 130, or any other component of the system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the medical device(s) 110, the terminal device(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
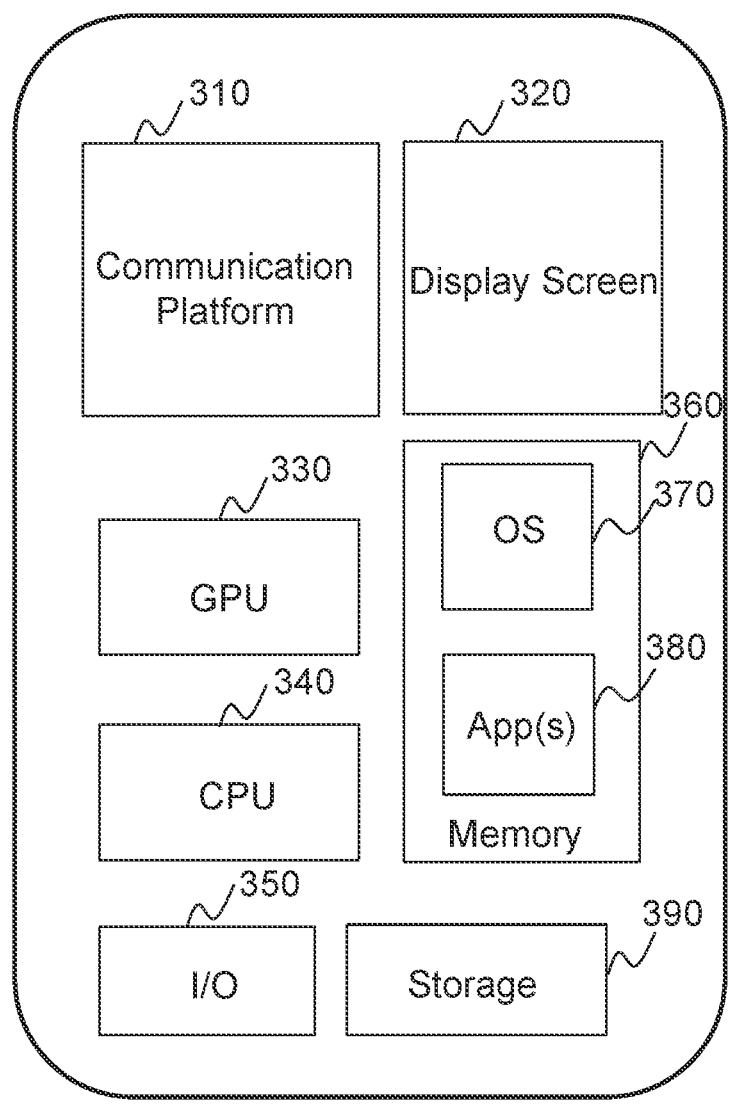
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. In some embodiments, one or more terminal devices 140 and/or a processing device 120 may be implemented on a mobile device 300, respectively.

As illustrated in FIG. 3, the mobile device 300 may include a communication platform 310, a display screen 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 to be executed by the CPU 340. The applications 380 may include a browser or any other suitable mobile apps for receiving and rendering information relating to access requests regarding target information or other information from the processing device 120. User interactions with the information stream may be achieved via the I/O 350 and provided to the processing device 120 and/or other components of the system 100 via the network 150.

To implement various modules, units, and functionalities described in the present disclosure, computer hardware platforms may be used as the hardware platform(s) for one or more of the elements described herein. The hardware elements, operating systems and programming languages of such computers are conventional, and it is presumed that those skilled in the art are adequately familiar therewith to adapt those technologies for image data acquisition as described herein. A computer with user interface elements may be used to implement a personal computer (PC) or another type of work station or terminal device, although a computer may also act as a server if appropriately programmed. It is believed that those skilled in the art are familiar with the structure, programming, and general operation of such computer equipment and as a result, the drawings should be self-explanatory.

Figure 4:
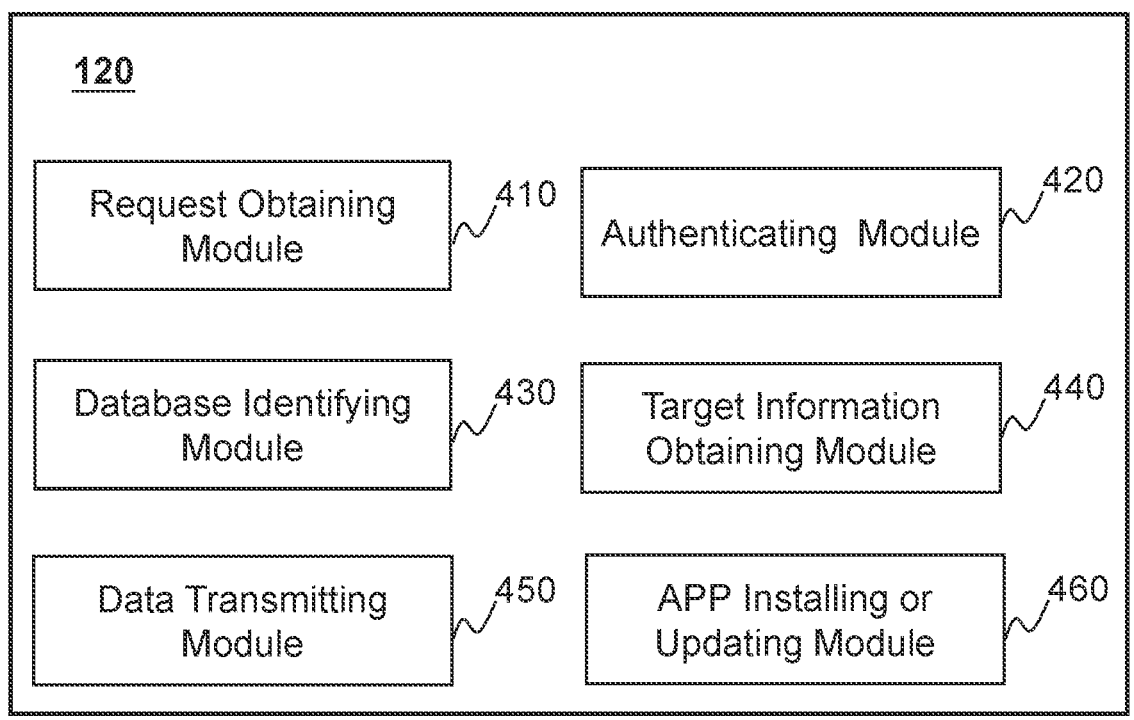
FIG. 4 is a block diagram illustrating an exemplary processing device according to some embodiments of the present disclosure.

FIG. 4 is a block diagram illustrating an exemplary processing device 120 according to some embodiments of the present disclosure. In some embodiments, the processing device 120 may be implemented on a computing device (e.g., the computing device 200) or a processing unit (e.g., the processor 210 illustrated in FIG. 2 or the CPU 340 as illustrated in FIG. 3).

As illustrated in FIG. 4, the processing device 120 may include a request obtaining module 410, an authenticating module 420, a database identifying module 430, a target information obtaining module 440, a data transmitting module 450, an APP installing or updating module 460.

The request obtaining module 410 may be configured to obtain an access request regarding target information. For example, the request obtaining module 410 may obtain, from a terminal device 140, an access request regarding target information. The access request may be a request for obtaining the target information stored in a target database, and/or presented on the terminal device 140. The target information may be patient information (e.g., the age, the gender, an occupation, a medical history, etc.) of a certain patient, medical imaging data (e.g., an original medical image, a processed medical image) of the certain patient, a medical report of the certain patient, statistical data of a plurality of patients or hospitals, or the like, or any combination thereof.

The authenticating module 420 may be configured to authenticate a terminal device and/or determine whether a terminal device is authenticated. For example, the authenticating module 420 may determine whether the terminal device 140 is authenticated based on an Internet protocol (IP) address of a network via which the terminal device 140 transmits the access request, authentication information the terminal device 140 provides relating to the access request, or the like, or any combination thereof. As another example, the authenticating module 420 may authenticate a terminal device (e.g., a terminal device 140) according to the process 1000 described in FIG. 10 of the present disclosure. In some embodiments, a determination result of whether the terminal device 140 is authenticated may be configured to determine whether the terminal device 140 may obtain the target information relating to the access request.

The database identifying module 430 may be configured to identify a target database. For example, the database identifying module 430 may identify, from a plurality of databases, a target database based on the access request. In some embodiments, the target database may be one of the plurality of databases and include the target information regarding the access request. The database identifying module 430 may identify the target database based on the identifier of the access request.

The target information obtaining module 440 may be configured to obtain target information. For example, the target information obtaining module 440 may obtain the target information regarding the access request by accessing the target database. In some embodiments, the target information may be information that a user of the user terminal 140 wants to obtain from the processing device 120 (or a storage device of the system 100).

The data transmitting module 450 may be configured to transmit information to a terminal device. In some embodiments, the data transmitting module 450 may transmit the target information regarding the access request to the terminal device 140. In some embodiments, the data transmitting module 450 may transmit the target information to the terminal device 140 in a safe manner. For example, the data transmitting module 450 may transmit the target information to the terminal device 140 via a browser or an application program. As another example, the data transmitting module 450 may transmit the target information to the terminal device 140 via a private network (e.g., a local area network of a hospital). As still another example, the data transmitting module 450 may communicate with the terminal device 140 via a public network, and the target information may be encrypted and transmitted to the terminal device 140. In some embodiments, in response to determining that the terminal device 140 is not authenticated by the authenticating module 420, the data transmitting module 450 may transmit notification indicating that the access request is denied to the terminal device 140.

The APP installing or updating module 460 may be configured to install or update an application program in a terminal device. In some embodiments, the APP installing or updating module 460 may obtain an application installation or update request from the terminal device 140, identify, from a plurality of databases, a second target database based on the terminal device 140 and the application installation or update request, obtain an installation or update package related to the application installation or update request from the second target database, and transmit the installation or update package to the terminal device 140.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, some other components/modules (e.g., a storage module) may be added into and/or omitted from the processing devices 120. Each of the modules described above may be a hardware circuit that is designed to perform certain actions, e.g., according to a set of instructions stored in one or more storage media, and/or any combination of the hardware circuit and the one or more storage media.

Figure 5:
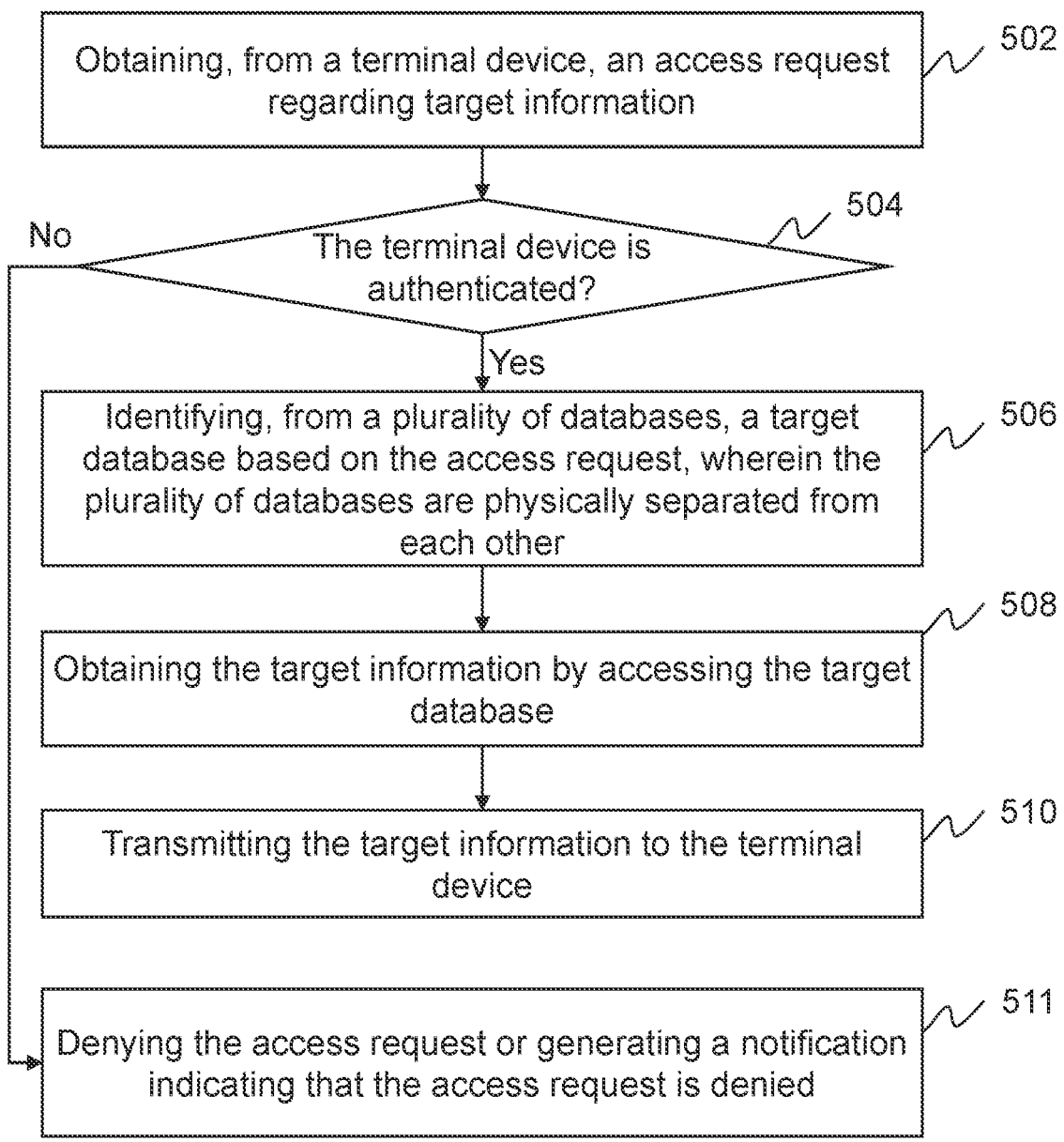
FIG. 5 is a flowchart illustrating an exemplary process for accessing target information according to some embodiments of the present disclosure.

FIG. 5 is a flowchart illustrating an exemplary process 500 for accessing target information according to some embodiments of the present disclosure. In some embodiments, process 500 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of the process 500 illustrated in FIG. 5 and described below is not intended to be limiting.

In 502, the processing device 120 (e.g., the request obtaining module 410) may obtain, from a terminal device 140, an access request regarding target information.

In some embodiments, the access request may be a request for obtaining the target information stored in a target database, and/or presented on the terminal device 140. The target information may be patient information (e.g., the age, the gender, an occupation, a medical history, etc.) of a certain patient, medical imaging data (e.g., an original medical image, a processed medical image) of the certain patient, a medical report of the certain patient, statistical data of a plurality of patients or hospitals, or the like, or any combination thereof. For example, the access request may be sent by a patient (or a medical staff thereof) for displaying patient information (or a medical image, a medical report) of the patient on the terminal device 140.

In some embodiments, the access request may include an identifier of the target information. In some embodiments, the identifier may indicate a target dataset in which the target information is stored, a target patient relating to the target information, or the like, or any combination thereof. For example, the identifier may include a database identifier, a patient identifier, a category identifier of the medical information, an application identifier, or the like, or any combination thereof.

In some embodiments, the terminal device 140 may transmit the access request to the processing device 120 in a secure manner to ensure a secure access process. For example, the terminal device 140 may initiate the access request via an application program or a browser installed in the terminal device 140. A user of the terminal device 140 may initiate the access request via a display interface (e.g., an interface 900 in FIG. 9) of a browser or an application program. The same-origin policy and security policy of the browser or the application program may be employed to deploy a secure access process of the target information. An exemplary process for accessing databases using a browser or an application program may be found elsewhere of the present disclosure. See, e.g., FIG. 7 and the descriptions thereof. As another example, the terminal device 140 may transmit the access request to the processing device 120 via a private network (e.g., a local area network of a hospital). As still another example, the terminal device 140 may communicate with the processing device 120 via a public network, and the access request may be encrypted and transmitted to the processing device 120. The processing device 120 may obtain and decrypt the encrypted access request.

In 504, the processing device 120 (e.g., the authenticating module 420) may determine whether the terminal device 140 is authenticated.

In some embodiments, a determination result of whether the terminal device 140 is authenticated may be configured to determine whether the terminal device 140 may obtain the target information relating to the access request. In some embodiments, the processing device 120 may determine whether the terminal device 140 is authenticated based on an Internet protocol (IP) address of a network via which the terminal device 140 transmits the access request. For example, the terminal device 140 may communicate with the processing device 120 via a private network (e.g., a local area network of a hospital), and an IP address of the local area network of the hospital may indicate that the terminal device 140 is authenticated. In some embodiments, the processing device 120 may determine whether the terminal device 140 is authenticated based on authentication information the terminal device 140 provides relating to the access request. For example, before or together with sending the access request, the terminal device 140 may send the authentication information to the processing device 120.

Exemplary authentication information may include an account name, an ID number, a device ID, a phone number, biometric information, a password, or the like, or any combination thereof. Exemplary biometric information may include a face image, a fingerprint, an iris image, a voice print, etc. In some embodiments, a terminal device may be registered in the system 100 before transmitting an access request, and predetermined authentication information may be stored in a storage device (e.g., the storage device 130, the storage 220, the storage 390, etc.) of the system 100. Input authentication information from the terminal device 140 that matches the predetermined authentication information may indicate that the terminal device 140 is authenticated. In some embodiments, a multi-step authentication process may be used. An exemplary multi-step authentication process includes a combination of at least two of a fixed password, a one-time authentication code, biometric information, or the like. A one-time authentication code may be dynamically generated when a first authentication is satisfied and transmitted to the terminal device or a user by, e.g., a phone call, a text message, email, etc. Such a one-time authentication code may be valid only for a certain amount of time. In some embodiments, the processing device 120 may determine whether the terminal device 140 is authenticated based on both the IP address and the authentication information. An exemplary process for authenticating a terminal device may be found elsewhere (e.g., FIG. 10 and the descriptions thereof) in the present disclosure.

In 506, in response to determining that the terminal device 140 is authenticated, the processing device 120 (e.g., the database identifying module 430) may identify, from a plurality of databases, a target database based on the access request.

In some embodiments, the plurality of databases may be deployed in a storage device (e.g., the storage device 130, the storage 220, the storage 390, etc.) of the system 100 by a developer of the system 100 or a third-party vendor. In some embodiments, the plurality of databases may be physically separated from each other. The term "physically separated" refers to that the plurality of databases are isolated from one another and store their own medical information (or bundle their own application software, libraries, and/or configuration files). For example, each database may be a virtual container (e.g., a Docker container), a virtual machine, or the like, or any combination thereof. The plurality of physically separated databases may allow processes (e.g., an information accessing process, an invoking process of an application program, etc.) regarding each of the plurality of databases to be performed in isolation without being affected by the presence or operations of other physically separated databases. Among the plurality of physically separated databases, the execution of a process in one database is not allowed to access or otherwise use information or resources of any other databases. For instance, among the plurality of physically separated databases, one database that contains images receives an access request to retrieve an image of a patient, information on another database that contains information regarding the medical history of the patient is not accessible in response to the access request. In some embodiments, the physically separated databases may allow the medical information or an APP stored in each database to be deployed or updated effectively. For example, each APP may be deployed and/or updated separately in the corresponding database. Thus, each APP may be installed and/or updated separately in the terminal device. An exemplary process for installing or updating an APP may be found elsewhere in the present disclosure. See, e.g., FIGS. 11 and 12, and the descriptions thereof.

In some embodiments, some of the plurality of databases may include medical information relating to a plurality of patients obtained from the medical device(s) 110 and/or the terminal device(s) 140. For example, medical information relating to the plurality of patients may be obtained from the medical device(s) 110 and classified into a plurality of different categories. Each of the plurality of different categories of medical information may be obtained and stored in one of the plurality of databases. For example, the medical information may be classified into a category of patient information, a category of medical imaging data, a category of medical reports, or the like, or any combination thereof. The patient information may be stored in a first database, medical imaging data may be stored in a second database, and medical reports may be stored in a third database. In some embodiments, a category of medical information may be stored in a database together with an application program (APP). For example, the patient information and a patient information APP may be stored in a database. The patient information APP may be configured to process the patient information (e.g., analyzing the patient information). As another example, the medical imaging data and a medical image APP may be stored in another database. The medical image APP may be configured to process the medical imaging data (e.g., performing an image reconstruction, etc.). In some embodiments, some of the plurality of databases may include application programs relating to the medical information and/or the medical device(s) 110. For example, each application program (and/or the libraries, the configuration files of the application program) may be stored in one of the plurality of databases, respectively. The application program may include an image processing application program, an automated measurement application program, an application program for operating a medical device (e.g., the medical device 110), or the like, or any combination thereof. The image processing application program may be configured to process imaging data relating to the system 100. For example, the image processing application program may include an image optimization application program, an image segmentation application program, an image fusion application program, an application program for guiding user operations for processing an image, a workflow application program for processing an image, or the like, or any combination thereof. In some embodiments, the image processing application program may be artificial intelligence (AI) related. In some embodiments, the automated measurement application program may be configured to automatically perform an image segmentation, identify a region of interest, and/or measure a size, a volume, an area, etc., of an ROI in a medical image. The application program may a remote operator (e.g., a remote specialist, a developer of the medical device 110, a maintenance staff of the medical device, etc.) to operate the medical device 110 via the network 150 (e.g., a 5G network). An exemplary process for installing or updating an APP may be found elsewhere in the present disclosure. See, e.g., FIGS. 11 and 12, and the descriptions thereof.

In some embodiments, the target database may be one of the plurality of databases and include the target information regarding the access request. In some embodiments, the processing device 120 may identify the target database based on the identifier of the access request. For example, the processing device 120 may determine an identifier of the access request. The identifier may include a database identifier that indicates a dataset in which the target information is stored. For example, the access request is a request for displaying a medical image of a patient A. The identifier of the access request may include a category of medical image data. The processing device 120 may determine the category of medical image data based on the identifier of the access request, and identify a database where the category of medical image data is stored as the target database.

In 508, after identifying the target database, the processing device 120 (e.g., the target information obtaining module 440) may obtain the target information by accessing the target database.

In some embodiments, the target information may be information that a user of the user terminal 140 wants to obtain from the processing device 120 (or a storage device of the system 100). For example, the target information may include patient information (e.g., the age, the gender, an occupation, a medical history, etc.) of a certain patient, medical imaging data (e.g., an original medical image, a processed medical image) of the certain patient, a medical report of the certain patient, statistical data of a plurality of patients or hospitals, a guidance of user operations for processing an image, a workflow for processing an image, or the like, or any combination thereof. In some embodiments, the processing device 120 may determine a patient identifier based on the access request, and access the target database to obtain the target information relating to the patient identifier. As another example, the processing device 120 may run an application program stored in the target database to obtain the target information. An exemplary process for accessing target information may be found elsewhere (e.g., FIG. 6 and the descriptions thereof) in the present disclosure.

In 510, the processing device 120 (e.g., the data transmitting module 450) may transmit the target information to the terminal device 140.

In some embodiments, the processing device 120 may transmit the target information to the terminal device 140 in a safe manner. For example, the processing device 120 may transmit the target information to the terminal device 140 via a browser or an application program. The target information may be displayed on an interface of the browser or the application program. As another example, the processing device 120 may transmit the target information to the terminal device 140 via a private network (e.g., a local area network of a hospital). As still another example, the processing device 120 may communicate with the terminal device 140 via a public network, and the target information may be encrypted and transmitted to the terminal device 140. The processing device 120 may obtain and decrypt the encrypted target information.

Referring back to operation 504, in response to determining that the terminal device 140 is not authenticated, in 511, the processing device 120 (e.g., the data transmitting module 450) may deny the access request and/or generate a notification indicating that the access request is denied.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, one or more other optional operations (e.g., a storing operation) may be added elsewhere in the process 500. As another example, operation 504 may be implemented before operation 502. The processing device 120 may first determine whether the terminal device 140 is authenticated, and in response to determining that the terminal device 140 is authenticated, the processing device 120 may obtain the access request from the terminal device 140.

Figure 6:
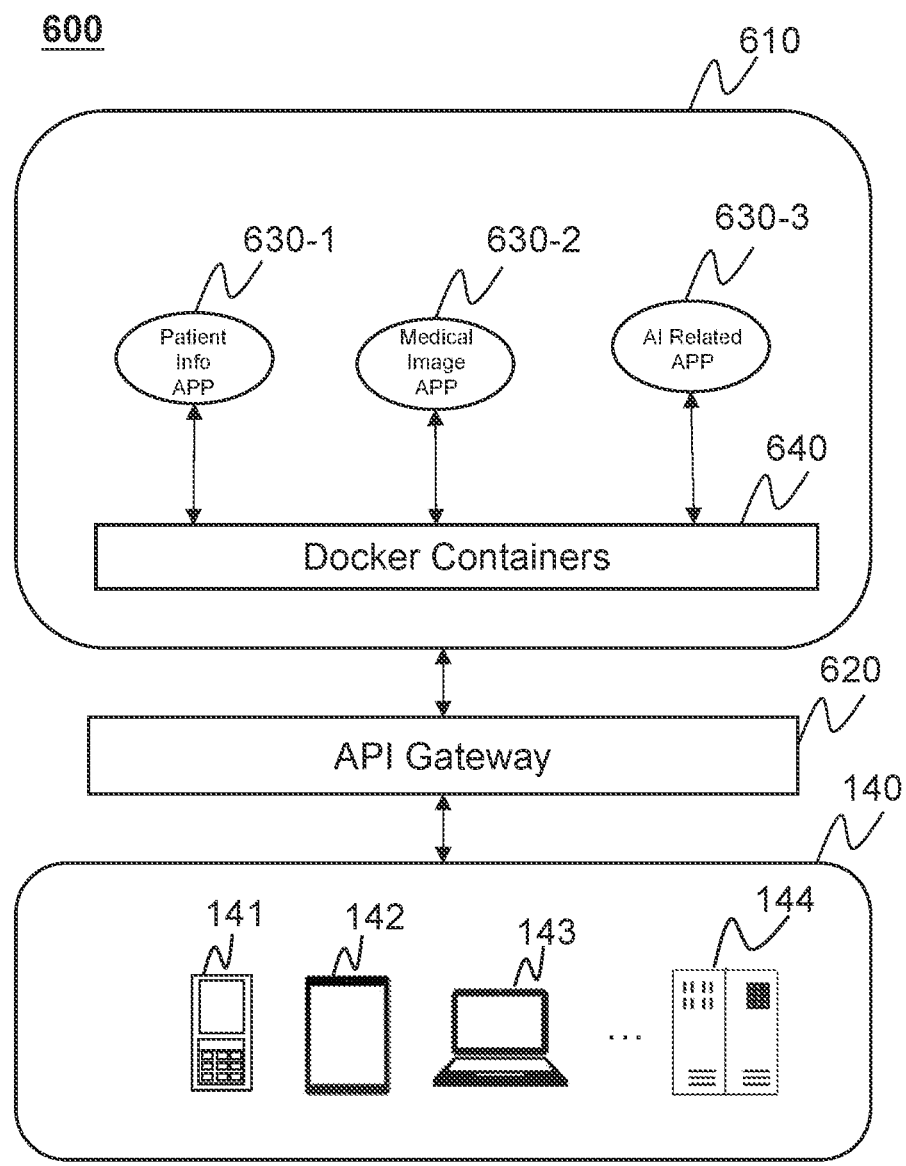
FIG. 6 is a schematic diagram illustrating an exemplary process for accessing target information according to some embodiments of the present disclosure.

FIG. 6 is a schematic diagram illustrating an exemplary process 600 for accessing target information according to some embodiments of the present disclosure. As shown in FIG. 6, a terminal device 140 may access a server 610 (e.g., the processing device 120, the storage device 130, a microservices platform, etc.) via an application program interface (API) gateway 620. The API gateway may act as a reverse proxy to accept all application programming interface (API) calls, aggregate various services needed to fulfill the API calls, and return a result to the terminal device 140. In some embodiments, the API gateway 620 may be a single entry point through which the terminal device 140 initiates one or more access requests. In some embodiments, the API gateway may include a web API gateway that enables a medical device 144 to access the server 610, a mobile API gateway that enables a terminal device 140 (e.g., a mobile device 141, a tablet device 142, or a laptop computer 143) to access the server 610. As shown in FIG. 6, a patient information application program (APP) 630-1, a medical image APP 630-2, and an AI related APP 630-3 may be deployed on the server 610. The three APPs may be physically separated from each other by way of virtual containers (e.g., Docker containers 640), that is, the plurality of databases may include a plurality of Docker containers 640. For example, the patient information APP 630-1, the medical image APP 630-2, and the AI related APP 630-3 and their respective libraries, and/or configuration files may be stored in a Docker container, respectively. Each APP and the corresponding libraries, and/or configuration files may be managed and/or used independently. A Docker container may run the corresponding APP inside a sandbox. The sandbox may provide an independent environment for each APP. An exemplary architecture of Docker containers may be found elsewhere in the present disclosure. See, e.g., FIG. 8 and the descriptions thereof.

In some embodiments, the target information regarding the access request may be obtained via a Docker image. For example, after authenticating the access request from the terminal device 140, the server 610 may instantly allocate resources and deploy corresponding application instances from a Docker image. After the terminal device 140 obtains the target information (the access request being fulfilled and terminated), the server 610 may instantly recover the resources to make them available for future deployment. In some embodiments, when the terminal device 140 access an APP (the patient information APP 630-1, the medical image APP 630-2, or the AI related APP 630-3) via a browser or an application program installed in the terminal device 140, the same-origin policy and/or security policy of the browser or the application program may ensure a secure access process of the target information.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, other databases, such as virtual machines, may be physically separated and configured to store the plurality of APPs.

Figure 7:
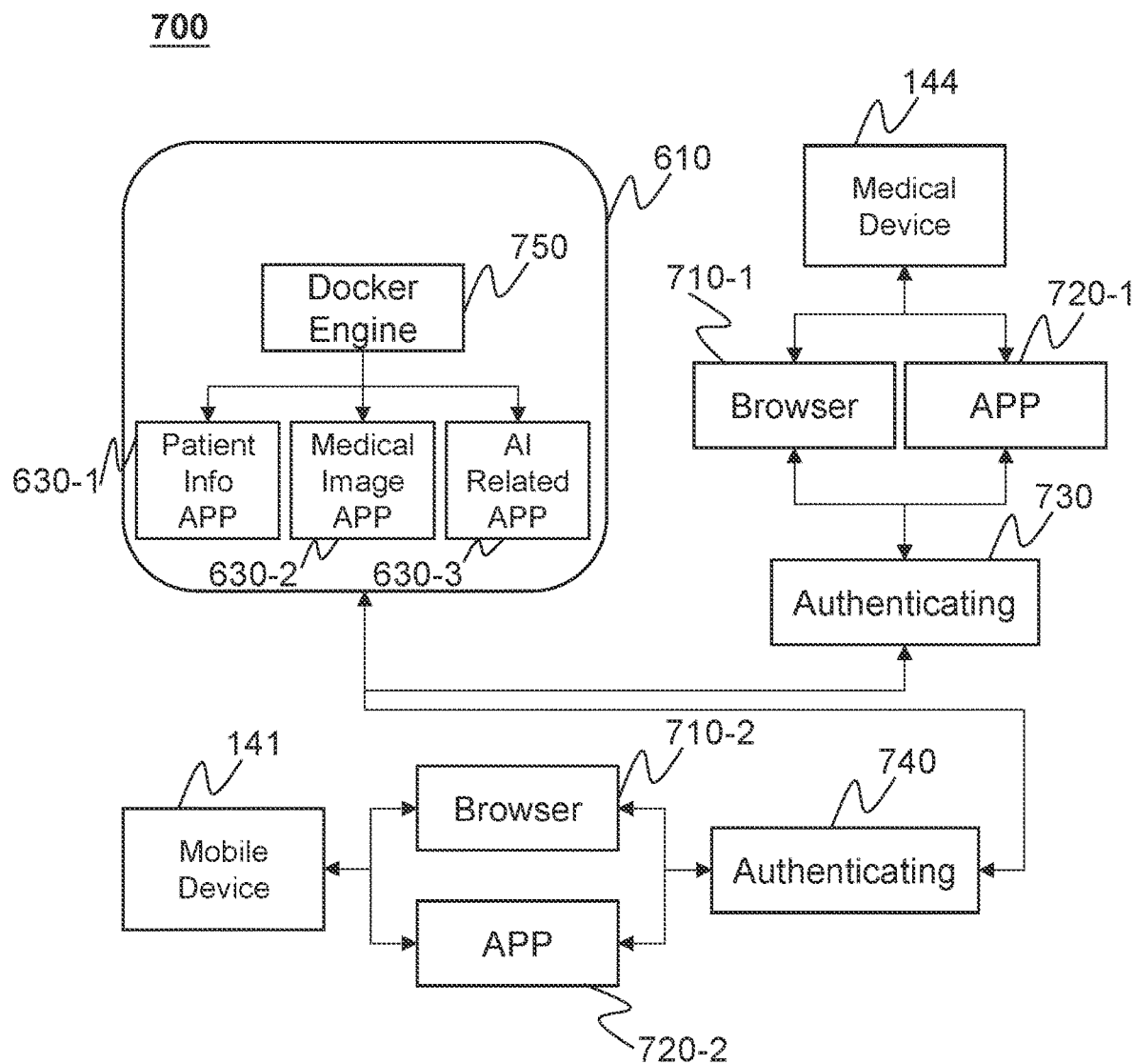
FIG. 7 is a schematic diagram illustrating an exemplary process for accessing a server using a browser or an application program according to some embodiments of the present disclosure.

FIG. 7 is a schematic diagram illustrating an exemplary process 700 for accessing a server using a browser or an application program according to some embodiments of the present disclosure. As shown in FIG. 7, a browser 710-1 (or 710-2) and/or an application program (APP) 720-1 (or 720-2) may be installed in a medical device 144 (or a mobile device 141). An access request regarding target information may be initiated by a user via the APP 720-1 (or 720-2) or the browser 710-1 (or 710-2). In some embodiments, before or during the medical device 144 (or the mobile device 141) transmits the access request to the server 610, at 730, a result as to whether the medical device 144 (or the mobile device 141) is authenticated to obtain the target information from the server is determined. An exemplary process for determining whether a terminal device is authenticated may be found elsewhere in the present disclosure. See, e.g., FIG. 10 and the descriptions thereof. At the server 610, a Docker engine 750 may be activated when obtaining an access request or authentication information. As shown in FIG. 7, three APPs (a patient information APP 630-1, a medical image APP 630-2, and an AI related APP 630-3) may be physically separated from each other. For example, each APP (and the corresponding libraries, and/or configuration files) may be deployed in a Docker container. If the medical device 144 (or the mobile device 141) is authenticated, the target information of the access request may be obtained and transmitted to the corresponding browser 710-1 (or 710-2) and/or APP 720-1 (or 720-2). For example, the medical device 144 (or the mobile device 141) may obtain a medical image (also referred to as the target information) of a patient via a medical image APP 720-1 (or 720-2) installed in the medical device 144 (or the mobile device 141) and the medical image APP 630-2 at the server 610. In some embodiments, the browser 710-1 (or 710-2) may be a browser embedded in an APP 720-1 (or 720-2), a stand-alone browser, or the like, or any combination thereof. In some embodiments, the APP 720-1 (or 720-2) may be a stand-alone APP, an applet embedded in an APP (e.g., an applet of a TELEGRAM APP, a LINE APP, a WECHAT APP, etc.), or the like, or any combination thereof. In some embodiments, the plurality of APPs may be developed by a developer of the server or a third-party vendor.

Figure 8:
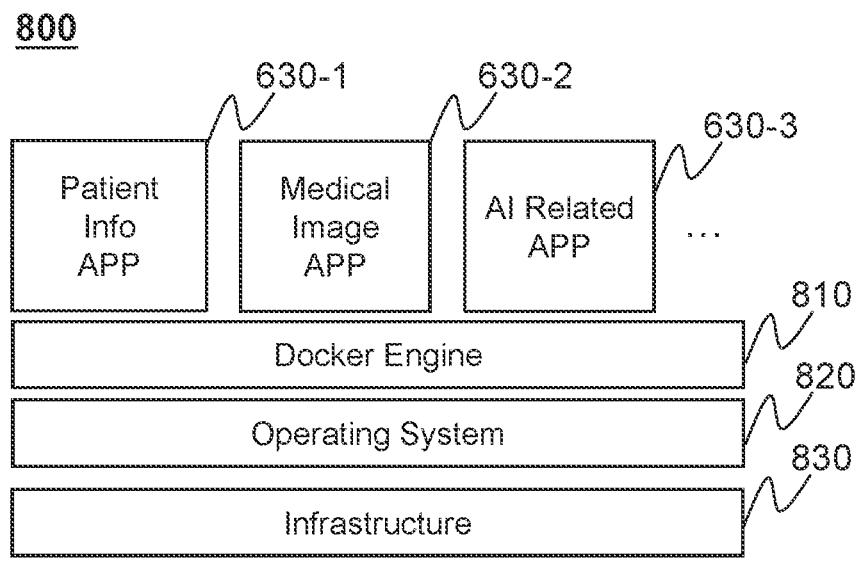
FIG. 8 is a schematic diagram illustrating an exemplary architecture of Docker containers according to some embodiments of the present disclosure.

FIG. 8 is a schematic diagram illustrating an exemplary architecture 800 of Docker containers according to some embodiments of the present disclosure. As shown in FIG. 8, a plurality of APPs 630-1, 630-2, and 630-3, a Docker engine 810, an operating system 820, and an infrastructure 830 may be stacked in sequence. The plurality of APPs may be physically separated from each other according to Docker containers. The Docker engine 810 may host the Docker containers, and all of the Docker containers may be run by a single operating system 820 (e.g., an operating system kernel). The Docker containers are lightweight, and a plurality of Docker containers may run simultaneously and in isolation. The infrastructure 830 may include one or more terminal devices 140.

Figure 9:
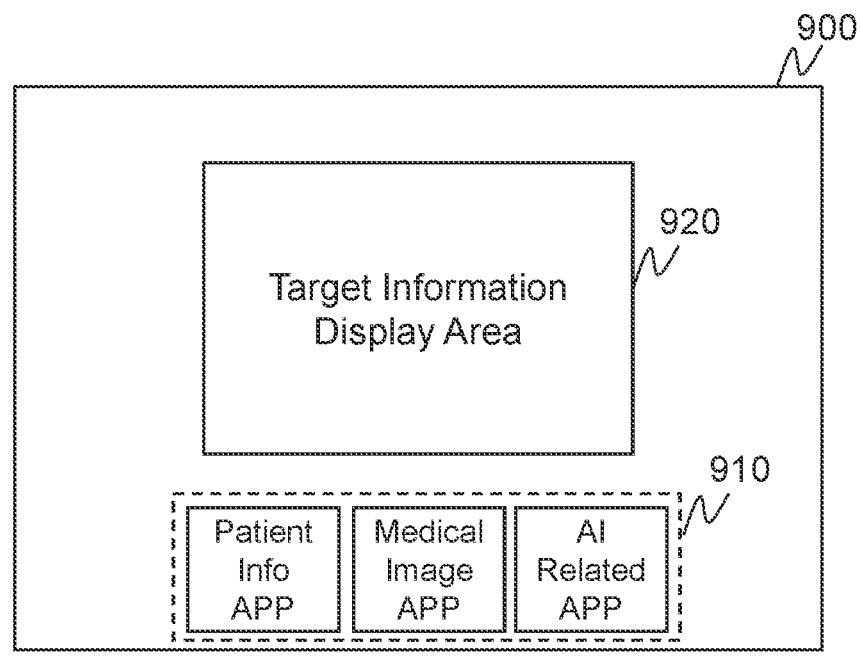
FIG. 9 is a schematic diagram illustrating an exemplary interface of a browser or an APP of a terminal device according to some embodiments of the present disclosure.

FIG. 9 is a schematic diagram illustrating an exemplary interface 900 of a browser or an APP of a terminal device according to some embodiments of the present disclosure. As shown in FIG. 9, control icons of a plurality of APPs may be integrated into the single interface 900, that is the plurality of APPs are embedded in a same browser of a same APP. A user of the terminal device 140 may initiate an access request by clicking an icon that is displayed inside a dotted rectangle 910. Target information relating to the access request may be display on the interface 900. For example, the target information (or a notification indicating that the access request is denied) may be displayed in a target information display area 920 in response to the access request. In some embodiments, information regarding an authentication process (or referred to as authentication process information) may also be displayed in the target information display area 920. Exemplary authentication process information may include a prompt requesting for authentication information (e.g., a password, a one-time authentication code, biometric information, etc.), a notification regarding the progress of an authentication process, a notification that the authentication process is successful or not, a notification that an access request is granted or denied. In some embodiments, each APP or each category of medical information may have a corresponding icon in the region 910 on the interface 900. By interacting with an icon corresponding to an APP or a category of medical information, the user may obtain target information corresponding to the APP or the category of medical information. For example, if the user clicks the icon of a medical image APP, a medical image may be displayed inside the target information display area 920. It should be noted that FIG. 9 is only for illustration purposes and not intended to be limiting. For instance, the terminal device 140 may interact with a server via various interfaces. As another example, each APP may have a respective interface or several APPs may share a same interface. As a further example, the arrangements of the icons and the target information display area 920 may be different from that illustrated in FIG. 9. In some embodiments, a user may be allowed to set or change the arrangement of the interface 900. In some embodiments, the arrangement of the icons and the target information display area 920 on the interface 900 may be dynamically adjusted automatically or according to a user instruction. For instance, when target information is displayed, the region 910 may fade, shrink, move to a corner of the interface 900, or the like, or a combination thereof. As still a further example, one or more APPs of a medical device (also referred to as the terminal device 140) may be embedded into an interface of an imaging APP that is configured to control one or more components (e.g., a detector, a radiation source, etc.) of the medical device.

Figure 10:
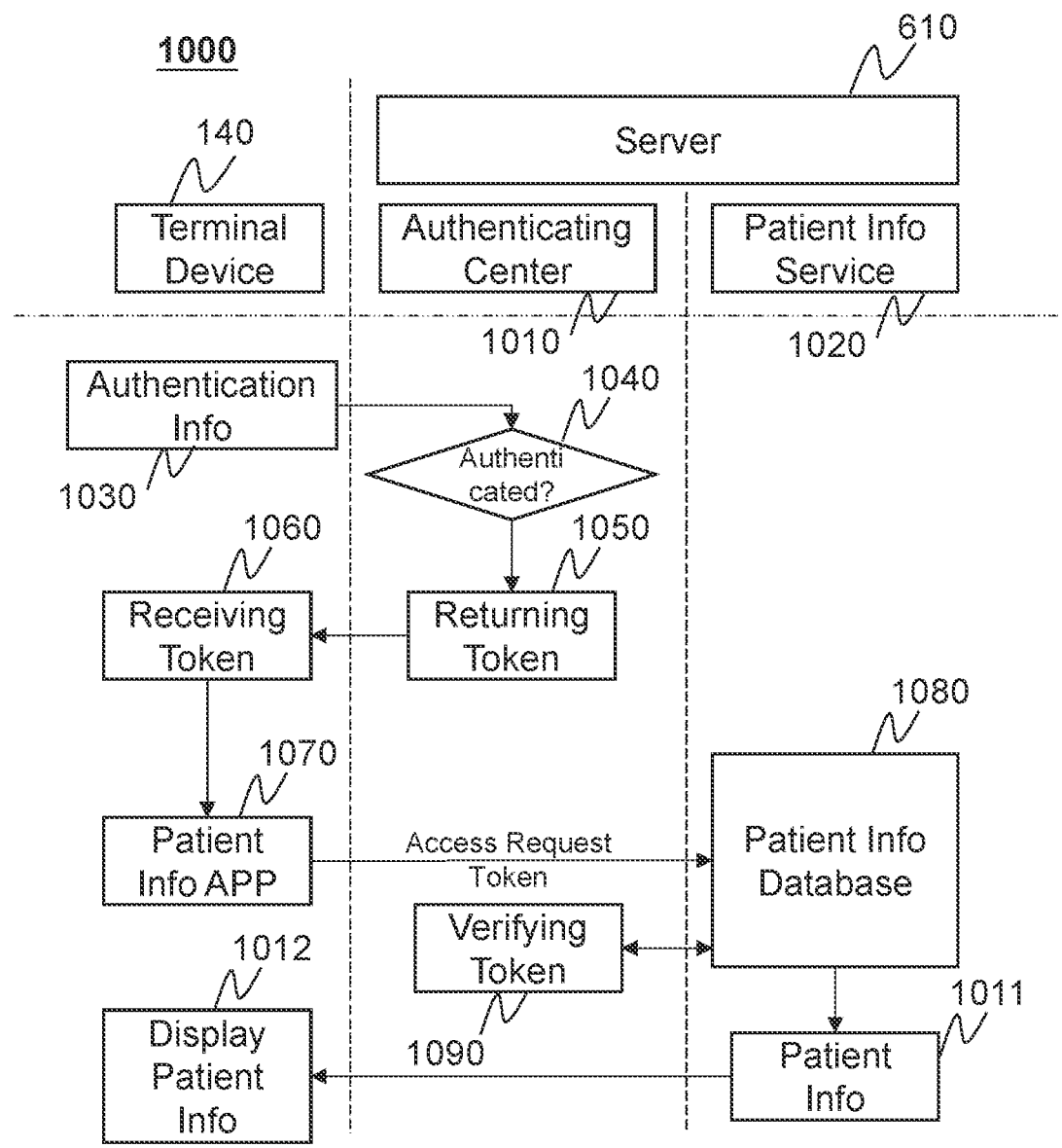
FIG. 10 is a schematic diagram illustrating an exemplary process for authenticating a terminal device according to some embodiments of the present disclosure.

FIG. 10 is a schematic diagram illustrating an exemplary process 1000 for authenticating a terminal device according to some embodiments of the present disclosure. In some embodiments, when a terminal device 140 is registered on a server 610 or the first time the terminal device 140 connects to the server 610, authentication information 1030 (e.g., an Internet protocol (IP) address, a Media Access Control (MAC) address, an account number, an ID number, a device ID, a phone number, biometric information (e.g., a face image, a fingerprint, an iris image, etc.), etc.) may be established and stored in the server 610. For example, when the first time that a medical device (e.g., an ultrasound device) connects to the server 610 via an IP address or a MAC address of a private network (e.g., a local area network) of a hospital, the server 610 may designate the MAC address as the authentication information 1030 of the medical device and store the MAC address in a device service of the server 610. The server 610 may allow devices that are connected to the private network of the hospital to communicate with the server 610. Thus, the MAC address of the medical device may be used as authentication information 1030 that is sent to the server 610. As another example, a user of a terminal device 140 (e.g., a medical device or a mobile device) or the terminal 140 device may register on the server 610 using an account name, an ID number, a device ID, a phone number, biometric information, a password, or the like, or any combination thereof. Exemplary biometric information may include a face image, a fingerprint, an iris image, a voiceprint, etc. After the registration, the server 610 may return a unique token. The unique token may link the user or the terminal device 140 with the registration information. The user or the terminal device 140 may communicate with the server 610 using the unique token, instead of registration information.

Referring back to FIG. 10, at 1040, a terminal device (e.g., the terminal device 140) may communicate with the server 610 to determine whether the terminal device 140 is authenticated. The server 610 may include an authenticating center 1010 and a patient information service 1020 (e.g., a patient information APP). At 1050, the authenticating center 1010 may be configured to generate a token in response to the first time the terminal device 140 connecting to the server 610. At 1060, the terminal device 140 may obtain the token from the authenticating center 1010 and store the token. When a user of the terminal device 140 interacts with an icon of a patient information APP 1070, the token together with an access request may be transmitted to the patient information service 1020 (e.g., the patient information APP) of the server 610. At 1090, the patient information service 1020 may send the token to the authenticating center 1010 and obtain a verification result from the authenticating center 1010. If the verification result indicates that the token is legal, at 1012, target patient information 1011 may be transmitted to the terminal device 140 for display. Otherwise, the access request may be denied or a notification indicating that the token is illegal may be transmitted to the terminal device 140.

Figure 11:
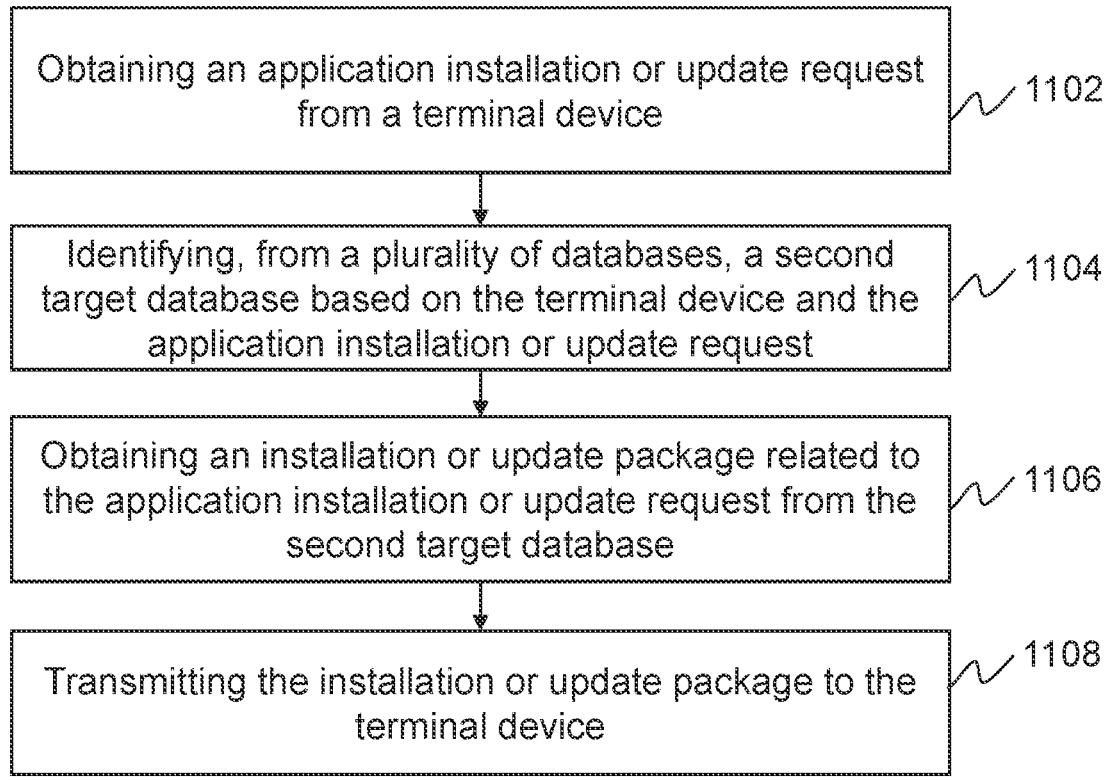
FIG. 11 is a flowchart illustrating an exemplary process for installing or updating an application program according to some embodiments of the present disclosure.

In some embodiments, existing medical information and/or APPs stored in one or more of the plurality of databases may be updated by a developer of the system 100 and/or an authorized third-party vendor. New medical information and/or APPs may be deployed on one or more new databases by the developer of the authenticated third-party vendor. FIG. 11 is a flowchart illustrating an exemplary process 1100 for installing or updating an application program according to some embodiments of the present disclosure. In some embodiments, process 1100 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 1100. The operations of the illustrated process presented below are intended to be illustrative. In some embodiments, the process 1100 may be accomplished with one or more additional operations not described and/or without one or more of the operations discussed. Additionally, the order of the operations of the process 1100 illustrated in FIG. 11 and described below is not intended to be limiting.

In 1102, the processing device 120 (e.g., the APP installing or updating module 460) may obtain an application installation or update request from a terminal device (e.g., the terminal device 140).

In some embodiments, an authenticated terminal device 140 may transmit the application installation or update request to the processing device 120 (e.g., an APP center of the processing device 120). The application installation or update request may be a request for installing a new APP (or a new APP or a new browser for accessing new medical information) or updating an existing APP (or an existing browser) in the terminal device 140. The process for determining whether the terminal device 140 is authenticated may be performed according to the process described in FIG. 10.

In 1104, the processing device 120 (e.g., the APP installing or updating module 460) may identify, from a plurality of databases, a second target database based on the terminal device 140 and the application installation or update request.

In some embodiments, the plurality of databases may be deployed by the developer of the system 100 or an authorized third-party vendor determined by the developer. In some embodiments, each database may have an identifier. The processing device 120 may determine an identifier of an APP relating to the application installation or update request, and identify a database from the plurality of databases that has the same identifier as the second target database. The second target database may store an installation package or updated package relating to the application installation or update request.

In 1106, the processing device 120 (e.g., the APP installing or updating module 460) may obtain an installation or update package related to the application installation or update request from the second target database. In 1108, the processing device 120 (e.g., the APP installing or updating module 460) may transmit the installation or update package to the terminal device 140. In some embodiments, after obtaining the installation or update package, the terminal device 140 may install or update the corresponding APP automatically. In some embodiments, the installation or update package may be free or charged.

As the plurality of databases are physically separated from each other, the installation or update package of the APP is limited to information available in the corresponding database, and information available in any other one of the plurality of databases is not accessible to complement or adjust the installation or update package of the APP. Any change to the corresponding database where the installation or update package is available (e.g., new information becoming available in the corresponding database, information on the corresponding database being updated or deleted) is irrelevant to information available in or an operation of any other one of the plurality of databases.

Figure 12:
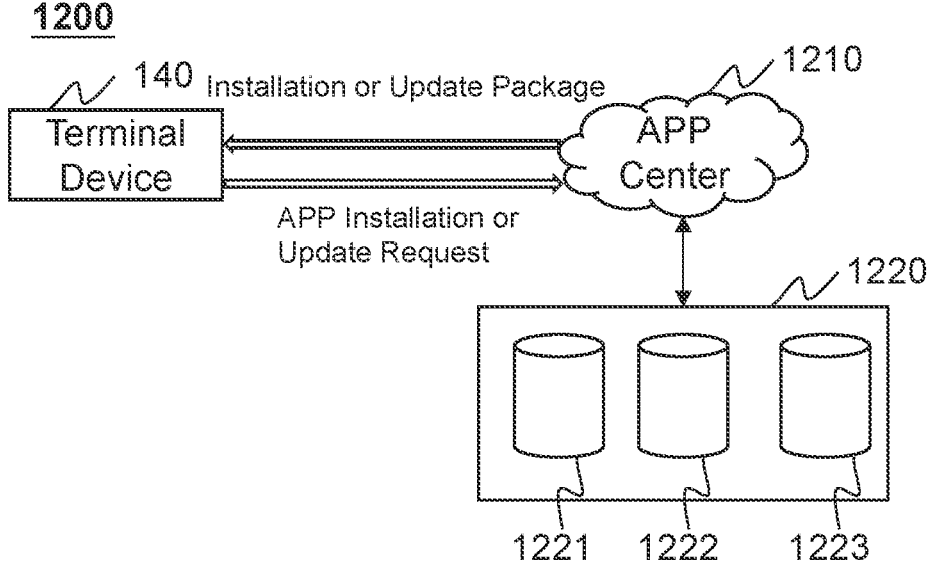
FIG. 12 is a schematic diagram illustrating an exemplary process for installing or updating an APP according to some embodiments of the present disclosure.

FIG. 12 is a schematic diagram illustrating an exemplary process 1200 for installing or updating an APP according to some embodiments of the present disclosure. As shown in FIG. 12, the terminal device 140 may transmit an APP installation or update request of a certain APP (or certain medical information) to an APP center 1210. The APP center 1210 may be configured to manage a plurality of databases 1220 (e.g., a database 1221, a database 1222, a database 1223, etc.). For example, the APP center 1210 may be a platform between terminal devices 140 and third-party software developers. The APP center 1210 may gather a plurality of installation or update packages of a plurality of APPs from a plurality of software developers, check whether the installation or update packages satisfy a standard, and provide eligible installation or update packages to a terminal devices 140. If the terminal device 140 is authenticated, the APP center 1210 may identify a database (also referred to as the second target database) that stores the certain APP (or certain medical information) and access the database to obtain an installation or update package. The installation or update package may be transmitted to the terminal device 140.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, one or more other optional operations (e.g., a storing operation) may be added elsewhere in the process 1100.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python, or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. The latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An ultrasound system for managing medical information, comprising:
    an ultrasound device configured to obtaining medical data;
    a terminal device configured to initiate an access request via an application program or a browser installed in the terminal device; and
    a server deploying a plurality of databases, the server including:
        at least one storage device including a set of instructions; and
        at least one processor configured to communicate with the at least one storage device, wherein when executing the set of instructions, the at least one processor is configured to direct the ultrasound system to perform operations including:
            obtaining, from the terminal device, the access request regarding target information;
            determining whether the terminal device is authenticated;
            in response to determining that the terminal device is authenticated, identifying, from the plurality of databases, a target database based on a category of target information, wherein the plurality of databases are physically separated from each other and include a plurality of Docker containers, each of a plurality of different categories of medical information is obtained and stored in one of the plurality of databases, each of the plurality of databases includes one category of medical information and an application program associated with the category of medical information, and the medical information is classified into a category of medical information including a category of patient information, a category of medical imaging data, and a category of medical reports;
            obtaining, via a Docker image, the target information by accessing the target database and running the application program stored in the target database;
            transmitting the target information to the terminal device; and
            displaying the target information on an interface of the browser or the application program installed in the terminal device.

2. The ultrasound system of claim 1, wherein the identifying the target database based on the category of target information includes:
    determining an identifier of the access request;
    determining the category of the target information based on the identifier; and
    identifying, from the plurality of databases, a database where the category of the target information is stored as the target database; wherein
    the access request includes an identifier of the target information, a database identifier indicates a target dataset in which the target information is stored, or a target patient relating to the target information.

3. The ultrasound system of claim 1, wherein the determining whether the terminal device is authenticated includes:
    determining whether the terminal device is authenticated based on an IP address of a network via which the terminal device transmits the access request; or
    determining whether the terminal device is authenticated based on authentication information the terminal device provides relating to the access request; or
    determining whether the terminal device is authenticated based on both the IP address and the authentication information.

4. The ultrasound system of claim 1, wherein the database of the plurality of databases is obtained by:
    obtaining a category of medical information relating to a plurality of patients; and
    obtaining the database of the plurality of databases by storing the medical information of the category.

5. The ultrasound system of claim 1, wherein the application program relating the medical information includes an image processing application program, the image processing application program includes at least one of an image optimization application program, an image segmentation application program, an image fusion application program, an application program for guiding user operations for processing an image, or a workflow application program for processing an image.

6. The ultrasound system of claim 1, wherein the operations further include:
    obtaining an application installation or update request from the terminal device;
    identifying, from the plurality of databases, a second target database based on the terminal device and the application installation or update request;
    obtaining an installation or update package related to the application installation or update request from the second target database; and
    transmitting the installation or update package to the terminal device.

7. The ultrasound system of claim 1, wherein the terminal device communicates with the ultrasound system via a local area network.

8. The ultrasound system of claim 1, wherein the ultrasound system is cloud-based.

9. The ultrasound system of claim 1, wherein the terminal device accesses the target database via an application programming interface (API) gateway.

10. The ultrasound system of claim 1, wherein the terminal device includes at least one of an ultrasound device, a computed tomography (CT) device, a magnetic resonance (MR) device, a positron emission tomography (PET) device, an X-ray photography device, an emission computed tomography (ECT) device, a single-photon emission computed tomography (SPECT) device, or a radiotherapy (RT) device.

11. The ultrasound system of claim 1, wherein the ultrasound system is configured to communicate with a plurality of terminal devices and manages medical information of the plurality of terminal devices.

12. The ultrasound system of claim 2, wherein the identifier of the target information includes a category identifier of the medical information and an application identifier.

13. The ultrasound system of claim 1, wherein the determining whether the terminal device is authenticated include:
  authenticating, based on authentication information, the terminal device by using a multi-step authentication process, wherein the multi-step authentication process includes a combination of at least two of a fixed password, a one-time authentication code, and biometric information;
  dynamically generating, the one-time authentication code when the first authentication is satisfied and transmitting the one-time authentication code to the terminal device, wherein the one-time authentication code is valid only for a certain amount of time.

14. The ultrasound system of claim 6, wherein each application program is deployed and/or updated separately in a corresponding database, and the each application program is installed and/or updated separately in the terminal device.

15. The ultrasound system of claim 1, wherein among the plurality of databases, an execution of a process in one database is not allowed to access or otherwise use information or resources of any other databases.

16. The ultrasound system of claim 14, wherein an installation or an update package of the application program is limited to information available in the corresponding database, and information available in any other one of the plurality of databases is not accessible to complement or adjust the installation or the update package of the application program, and any change to the corresponding database where the installation or the update package is available is irrelevant to information available in or an operation of any other one of the plurality of databases.

17. The ultrasound system of claim 1, wherein the obtaining, via the Docker image, the target information by accessing the target database and running the application program stored in the target database includes:
  obtaining, by the Docker container in the target database, the target information by running the application program stored in the target database inside a sandbox.

18. The ultrasound system of claim 17, wherein the sandbox is configured to provide an independent environment for each application program.

19. An ultrasound method for managing medical information, implemented on a system including an ultrasound device configured to obtaining medical data; a terminal device configured to initiate an access request via an application program or a browser installed in the terminal device; and a server deploying a plurality of databases, the server including: at least one storage device including a set of instructions and at least one processor configured to communicate with the at least one storage device, the method comprising:
  obtaining, from the terminal device, the access request regarding target information;
  determining whether the terminal device is authenticated;
  in response to determining that the terminal device is authenticated, identifying, from the plurality of databases, a target database based on the access request, wherein the plurality of databases are physically separated from each other and include a plurality of Docker containers, and each of a plurality of different categories of medical information is obtained and stored in one of the plurality of databases, wherein each database of the plurality of databases includes an application program relating the medical information, and an installation or update package of the application program is limited to information available in a corresponding database, information available in any other one of the plurality of databases is not accessible to complement or adjust the installation or update package of the application program, and any change to the corresponding database where the installation or update package is available is irrelevant to the information available in or an operation of any other one of the plurality of databases;
  obtaining, via a Docker image, the target information by accessing the target database and running the application program stored in the target database;
  transmitting the target information to the terminal device; and
  displaying the target information on an interface of the browser or the application program installed in the terminal device.

20. A non-transitory computer readable medium, comprising executable instructions that, when executed by at least one processor of an ultrasound system, direct the at least one processor to perform a method, the ultrasound system including an ultrasound device configured to obtaining medical data; a terminal device configured to initiate an access request via an application program or a browser installed in the terminal device; and a server deploying a plurality of databases, the method comprising:
  obtaining, from the terminal device, the access request regarding target information;
  determining whether the terminal device is authenticated;
  in response to determining that the terminal device is authenticated, identifying, from the plurality of databases, a target database based on a category of target information, wherein the plurality of databases are physically separated from each other and include a plurality of Docker containers, each of a plurality of different categories of medical information is obtained and stored in one of the plurality of databases, each of the plurality of databases includes one category of medical information and an application program associated with the category of medical information, and the medical information is classified into a category of medical information including a category of patient information, a category of medical imaging data, and a category of medical reports;
  obtaining, via a Docker image, the target information by accessing the target database and running the application program stored in the target database;
  transmitting the target information to the terminal device; and
  displaying the target information on an interface of the browser or the application program installed in the terminal device.

* * * * *